United States Patent [19]

Jae-Chang

[11] Patent Number: 5,511,053
[45] Date of Patent: Apr. 23, 1996

[54] LDP KARAOKE APPARATUS WITH MUSIC TEMPO ADJUSTMENT AND SINGER EVALUATION CAPABILITIES

[75] Inventor: Jeong Jae-Chang, Kyonggi-do, Rep. of Korea

[73] Assignee: Samsung Electronics Co., Ltd., Kyungki-Do, Rep. of Korea

[21] Appl. No.: 23,967

[22] Filed: Feb. 26, 1993

[30] Foreign Application Priority Data

Feb. 28, 1992 [KR] Rep. of Korea .................. 92-3252

[51] Int. Cl.$^6$ .............................. G11B 5/09; G09B 15/04
[52] U.S. Cl. ................................ 369/54; 369/48; 84/612; 84/636
[58] Field of Search ...................... 369/47, 48, 49, 369/50, 53, 54; 84/612, 645, 636, 610, 634

[56] References Cited

U.S. PATENT DOCUMENTS

| 4,345,501 | 8/1982 | Nakada et al. | 84/612 |
| 5,194,682 | 3/1993 | Okamura et al. | 84/645 |
| 5,243,582 | 9/1993 | Yamauchi et al. | 369/48 |

FOREIGN PATENT DOCUMENTS 03239293 10/1991 Japan .
04003192 1/1992 Japan .

*Primary Examiner*—Georgia Y. Epps
*Assistant Examiner*—P. W. Huber
*Attorney, Agent, or Firm*—Sughrue, Mion, Zinn, Macpeak & Seas

[57] ABSTRACT

The present invention relates to a laser disk player having a karaoke capability, and more particularly to a laser disk player karaoke apparatus that compares the tempo of a musical selection reproduced from a laser disk with the tempo at which a user is singing, in order to permit evaluation of singing ability. When the singer's tempo does not correspond with the tempo of the music, the apparatus can match the music's tempo reproduced from the laser disk to the user's singing tempo. Particularly, if an aural synchronizing signal is recorded on the laser disk to indicate where singing of a song should start, a time difference is obtained during playback, indicating the time between the aural synchronizing signal and an aural signal input by a user via an external microphone. The time difference is used to correct the playback tempo and to assess the user's singing ability. The laser disk player karaoke apparatus of the present invention, therefore, can prevent the discomfort resulting from discordant music by correcting the disagreement between the user's singing measure and the music's measure. The apparatus can also easily help the user evaluate his or her own singing ability by providing appropriate data and can thereby help the user improve poor singing habits.

19 Claims, 2 Drawing Sheets

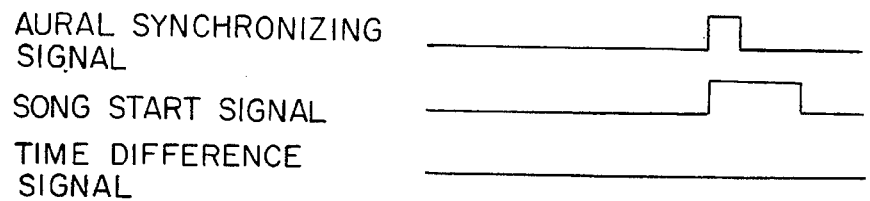
FIG.2A
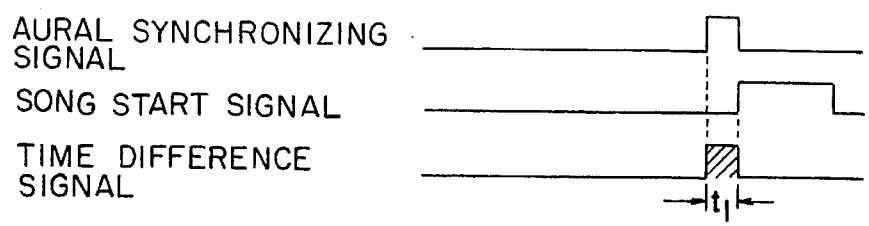
FIG.2B
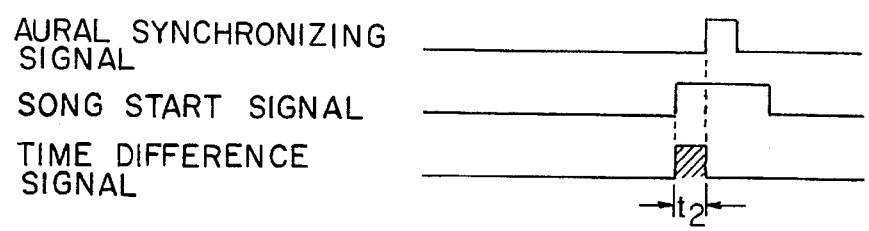
FIG.2C
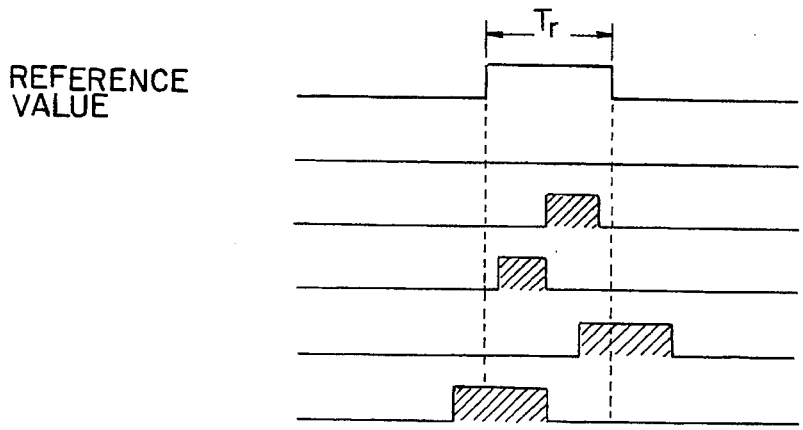
FIG.3A
FIG.3B
FIG.3C
FIG.3D
FIG.3E
FIG.3F ID KARAOKE APPARATUS WITH MUSIC
TEMPO ADJUSTMENT AND SINGER
EVALUATION CAPABILITIES

BACKGROUND OF THE INVENTION

1. Field of the Invention

The present invention relates to a LDP (Laser Disk Player) having a karaoke capability, and more particularly to a LDP karaoke apparatus that compares the tempo of a musical selection reproduced from a LD (Laser Disk) with the tempo at which a user is singing, input through a microphone, to thereby evaluate singing ability. When the singer's tempo does not correspond with the tempo of the music, the apparatus can match the music's tempo reproduced from the LD to the user's singing tempo. The present disclosure is based upon Korean Patent Application No. 92-3252, filed Feb. 28, 1992, which disclosure is hereby incorporated by reference into this disclosure.

2. Description of the Prior Art

A LDP is an electronic system in which a video signal and an audio signal are recorded onto a laser disk in digitized form, a high intensity collimated light, e.g., laser beam, is projected onto the surface of the disk, the light reflected from or transmitted by the disk is received by the system, and video and audio signals are reproduced in accordance with light quantity differences received by the system.

A karaoke capability is a function in which the music portion of an audio signal is reproduced from the LDP and mixed with a voice signal from an external source with the mixed signal thereafter being output. Accordingly, if a signal from the LDP is reproduced, the music signal is output and at the same time, various backdrops are displayed on a screen. When the pictorial image is displayed on the screen at the same time the music signal is output, the user can start singing to the accompaniment of a measure of the music signal.

However, all the current LDP karaoke apparatuses are designed to output the music signal at only a single, predetermined musical tempo. When the music signal of the LDP is output with a predetermined tempo at all times, regardless of the tempo at which the user is singing, a cacophony is sure to result, causing discomfort to listeners.

Furthermore, if a song is sung to the accompaniment of conventional LDPs, the user cannot gauge accurately whether his or her tempo matches that reproduced by the LDP. As such, the user is unable to assess his or her singing ability and improve thereon.

SUMMARY OF THE INVENTION

It is, therefore, an object of the present invention to solve the aforementioned problems by providing an LDP karaoke apparatus which can adjust the tempo of the LDP music signal to the user's singing tempo to thereby prevent a cacophony due to differences in tempo.

It is another object of the present invention to provide a LDP karaoke apparatus which can compare the user's singing tempo with the LDP music signal, whereby the tempo difference is quantified and displayed on the screen, so that the user's singing ability can be easily assessed.

In accordance with the objects of the present invention, there is provided an LDP karaoke apparatus that includes a tempo difference detector, a reproduced signal speed controller and a song appraisal unit.

The tempo difference detector detects a time difference between the user's aural signal input from an external source and an aural synchronizing signal derived by digitally processing information reproduced by a laser disk player.

The reproduced signal speed controller controls the output speed of an audio signal reproduced from the LD and output by a digital signal processor in accordance with the time difference detected by the tempo difference detector. The speed-adjusted output of the controller is supplied to an amplifier.

The song appraisal unit first compares a reference value with the difference between the aural signal and the aural synchronizing signal detected by the tempo difference detector. Then, if this difference exceeds a prescribed limit, the appraisal unit counts and stores the difference, to thereby provide appraisal data, indicative of the user's singing ability, to the digital signal processor.

BRIEF DESCRIPTION OF THE DRAWINGS

For a better understanding of the invention, reference will now be made, by way of example, to the accompanying drawings, in which:

FIGS. 2(A)–2(C) is a waveform drawing of an embodiment of a time difference between an aural synchronizing signal detected by the measure difference detector shown in FIG. 1 and the user's aural signal, wherein FIG. 2A shows a waveform drawing when there is no time difference between the aural synchronizing signal and the user's aural signal; FIG. 2B represents a waveform drawing of the time difference when the user's aural signal is lagging behind the aural synchronizing signal; and FIG. 2C displays a waveform drawing of the time difference when the user's aural signal precedes the aural synchronizing signal; and FIGS. 3(A)–3(F) is a waveform drawing showing the relationship between various time difference signals and a reference value utilized by the song appraisal unit of FIG. 1.

DETAILED DESCRIPTION OF THE PREFERRED EMBODIMENTS OF THE INVENTION

Figure 1:
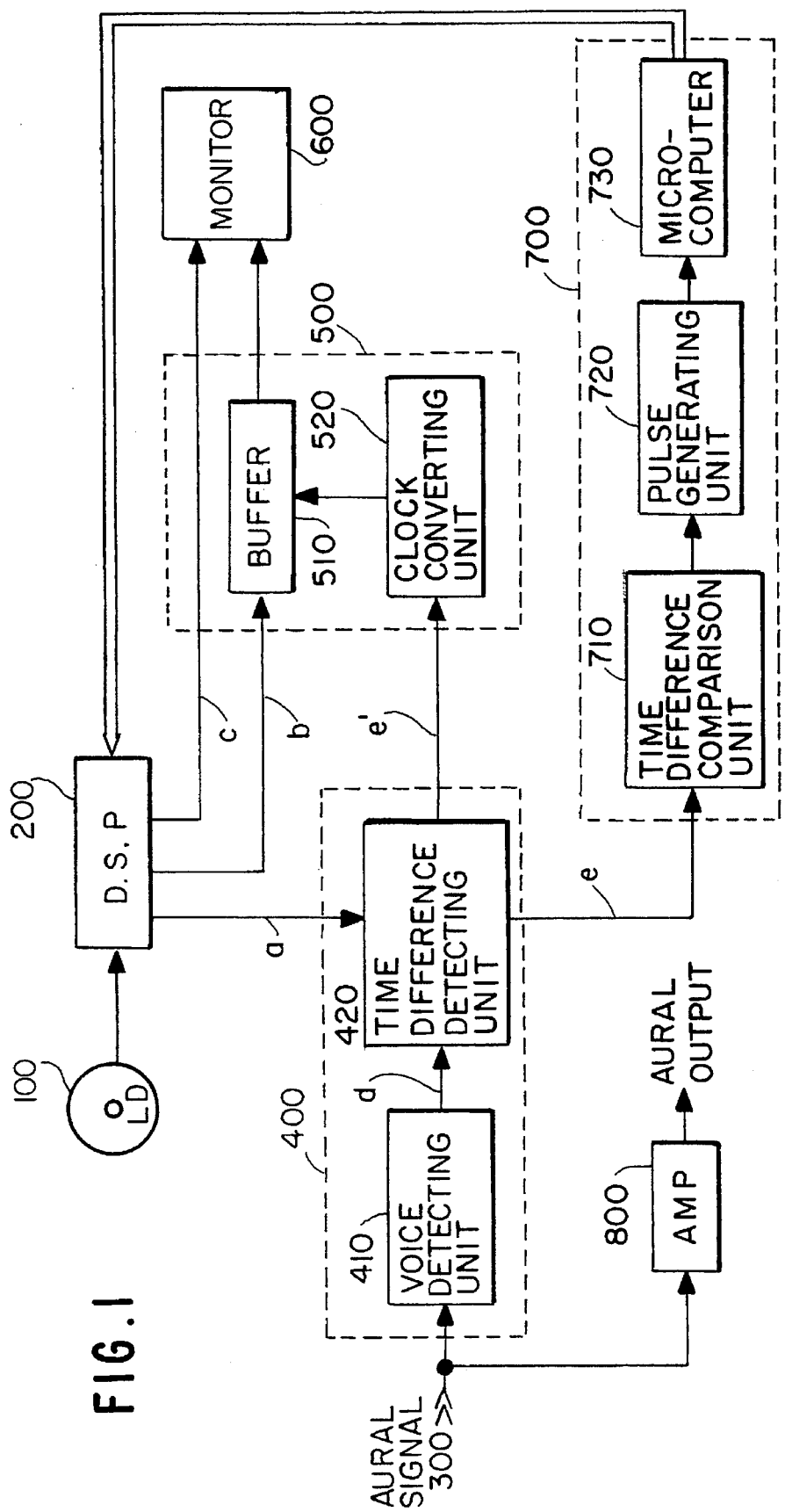
FIG. 1 is a block diagram of an LDP karaoke apparatus in accordance with the present invention.

As shown in FIG. 1, an embodiment of the LDP karaoke apparatus in accordance with the present invention includes a tempo difference detector 400, a reproduced signal speed controller 500 and a song appraisal unit 700.

The tempo difference detector 400 detects a time difference between the user's aural signal 300 input from an external source and an aural synchronizing signal "a" reproduced from the LD 100 and output by a digital signal processor 200.

The reproduced signal speed controller 500 controls the output speed of an audio signal "b", reproduced from the LD 100 and output by the digital signal processor 200, in accordance with the time difference detected by the tempo difference detector 400, to thereby output the speed-adjusted signal to an amplifier forming part of a monitor 600.

The song appraisal unit 700 first compares a reference value with the difference between the aural signal 300 and the aural synchronizing signal "a" detected by the tempo difference detector 400. Then, when the difference exceeds a prescribed limit, the unit 700 counts and stores the occurrence, to thereby provide data for appraising the user's singing ability with respect to the digital signal processor 200.

Meanwhile, the user's aural signal 300, input from an external source, is output to an amplifier 800, while the video signal reproduced from the LD 100, read by the digital signal processor 200 and processed thereafter, is displayed on the monitor 600.

The monitor 600 includes an amplifier which is separate from the amplifier 800 which amplifies the aural signal 300. However, in the case of an apparatus having a mixing amplifier, the audio signal reproduced from the LD 100 and the user's aural signal 300 can be mixed by the mixing amplifier to thereby be output.

The operation and results of the LDP karaoke apparatus in accordance with the above-described preferred embodiment will now be described with reference to the waveform diagrams of FIGS. 2(A)–2(C), Which Show the difference detected by the tempo difference detector 400, and the waveform diagrams of FIGS. 3(A)–3(F), generated by the song appraisal unit 700.

The signal reproduced from the LD 100 is supplied to the digital signal processor 200, which processes the signal reproduced from the LD 100 so that the aural synchronizing signal "a", the audio signal "b" and the video signal "c" can be separately output.

The audio signal "b" output by the digital signal processor 200 is temporarily stored in a buffer 510 of the reproduced signal speed controller 500. The buffer 510 is controlled by a clock signal supplied by a clock converting unit 520 such that the signal "b" is output through the amplifier of the monitor 600 in accordance with the clock signal.

The video signal "c" output by the digital signal processor 200 is output directly to the monitor 600 to thereby be displayed.

In accordance with the foregoing, when a song commences, an image and a sound are output through the monitor 600, and the user begins to sing through an external input means, such as a microphone or the like.

When the user begins to sing, the user's aural signal 300 is output through the amplifier 800 and simultaneously input to a voice detecting unit 410 of the tempo difference detector 400. The voice detecting unit 410, which includes an analog to digital (A/D) converter, converts the analog aural signal into a digital signal "d".

The time difference detecting unit 420 detects a time difference to between the digital signal d output from the voice detecting unit 410 and the aural synchronizing signal "a" supplied by the digital signal processor 200. This time difference is output from the unit 420 as a signal.

The aural synchronizing signal "a" is a signal recorded separately when the laser disk is manufactured, to indicate where the words of a song should be started. Generally, a plurality of signals are recorded for one song to thereby be used as a tempo gauge, and ultimately as a means for appraising the user's singing ability.

In other words, the time different to is the difference between the proper starting time in a song in accordance with a score and the time at which the user actually starts to sing. The time difference provides a measure difference, allowing it to be utilized to provide data for appraising the user's singing ability.

FIGS. 2(A)–2(C) is a waveform diagram showing one method of determining time difference between an aural synchronizing signal "a" detected by the tempo difference detector 400 and the user's aural signal 300.

According to FIG. 2A, there is no time difference between the aural synchronizing signal a and the aural signal d. In a circumstance where there is no time difference, it follows that the user is singing at the correct tempo. This is reflected in the fact that the aural synchronizing signal "a" from the digital signal processor 200 and the user's digitized aural signal 300 d corresponding rising edges.

FIG. 2B represents a waveform drawing of the time difference that results when the aural signal 300 lags behind the aural synchronizing signal "a". This happens whenever the user starts to sing later than the scored song, and, as a result, the aural synchronizing signal and the aural signal have a time difference t1.

FIG. 2C displays a waveform drawing of the time difference that arises when the aural signal precedes the aural synchronizing signal. This occurs wherever the user starts to sing ahead of the scored song, and gives rise to a time difference t2 between the aural synchronizing signal and the aural signal.

As seen from FIG. 1, the time difference signal "c" determined by the tempo difference detector 400 is supplied to the song appraisal unit 700.

Meanwhile, the tempo difference detector 400 outputs to the reproduced signal speed controller 500 a time difference signal "e" which differentiates between a case where the user's aural signal 300 is running ahead of the aural synchronizing signal "a" and a case where the user's aural signal 300 is lagging behind the aural synchronizing signal "a".

As a result, the clock converting means 520 of the reproduced signal speed controller 500 outputs a clock signal, the period of which is adjusted in accordance with the time difference signal "e" detected by the tempo difference detector 400.

In other words, in a situation where the user's aural signal 300 is running ahead of the aural synchronizing signal "a" a clock signal having a fast period is output In a situation where the user's aural signal 300 is lagging behind the aural synchronizing signal "a" a clock signal having a slow period is output. As such, the clock period output from the clock converting unit 520 changes in response to the time difference to detected by the time difference detecting unit 420.

As noted above, when the clock signal, which changes its period in accordance with the time difference to, is input the audio signal "b" temporarily stored in the buffer 510, is output at an appropriately adjusted speed through the amplifier of the monitor 600 in response to the time difference To.

Therefore, in a case where the user starts to sing later than a predetermined singing time, the audio signal "b" sequentially stored in the buffer 510, is output later than a normal singing time, so that the measure between the words of the song with which the user sings along and the audio signal reproduced from the LD can be matched.

Conversely, in a case where the user starts to sing faster than the predetermined singing time, the audio signal "b" sequentially stored in the buffer 510, is output faster than a normal singing time, so that the measure between the words of the song with which the user sings along and the audio signal reproduced from the LD can be matched.

The song appraisal unit 700 receives the time difference To output from the time difference detecting unit 420 of the tempo difference detector 400 and compares the time difference To with a reference value "Tr" in a time difference comparison unit 710.

The time difference comparison unit 710 outputs an error signal when the time difference To is larger than the reference value "Tr". Thus, it detects that the user's singing tempo does not match that of the audio signal. When the time difference To is smaller that the reference value "Tr" the time difference comparison unit 710 does not output the error signal. In this case, it detects that the user's singing tempo matches that of the audio signal.

FIGS. 3(A)–3(F) is a waveform diagram wherein a relationship is shown between the time difference To and the reference value "Tr" which relationship is compared by the time difference comparison unit 710 of the song appraisal unit 700.

According to FIG. 3A, the reference value "Tr" is set to a predetermined time which, however, can be adjusted.

Therefore, in cases where there is no time difference "e" output from the time difference detecting unit 420 of the tempo difference detector 400, as illustrated in FIG. 3B, or in cases where the time difference "e" is small, as illustrated in FIGS. 3C and 3D, the time difference signal lies within the reference value "Tr". From this, it is determined that the user's singing tempo approximates that of the song, so that no error signal is output from the time difference comparison unit 710.

If the time difference deviates too much from the reference value, namely, if the song is sung too slowly, or the song is sung too fast, the time difference signal deviates from the reference value as illustrated in FIGS. 3E and 3F. It is thus determined that the user's singing tempo does not match, so that an error signal is output by the time difference comparison unit 710.

A pulse generating unit 720 generates pulses whenever an error signal is generated by the time difference comparison unit 710. A microcomputer 730 then counts the pulses generated from the pulse generating unit 720.

When the user finishes singing, the microcomputer 730 appraises the user's singing ability based on the counted pulses. i.e., the microcomputer 730 outputs the appraisal data to the digital signal processor 200, which outputs the data to the monitor 600 to thereby be displayed. The microcomputer 730 additionally outputs word data in order to display a word "ENCORE" when the appraised marks are above certain reference scores. The digital signal processor 200 displays the appraised scores through the monitor 600, so that the user can sing an encore song.

Furthermore, the microcomputer 730 can store scores in an internal memory and keep displaying the scores via the digital signal processor 200 and the monitor 600. This allows the karaoke apparatus to rate many people's scores.

As seen from the foregoing, the LDP karaoke apparatus in accordance with the present invention has the advantage of preventing discomfort resulting from cacophony, in that it can correct for the User's singing tempo when his or her tempo does not match that of an original song.

Furthermore, because the user's singing ability is appraised, the user's singing ability itself can be easily assessed, so that a poor singing habit caused by an approximate tempo can be pin pointed and improved.

In addition, since other people's scores and ratings can be stored and displayed, a group activity can be designed in which many people can be involved.

From the forgoing detailed description of the invention and preferred embodiments, it has been shown how the object of the invention can be attained in a preferred arrangement. However, modifications and variations of the disclosed concepts are intended to be included within the scope of the invention.

Particularly, in the foregoing description, the explanation has focused on a karaoke apparatus which can control the speed of the audio signal and at the same time appraise the user's singing ability. However, it is apparent that an apparatus can be provided which only controls the speed of the audio signal, or which only appraises the singing ability.

Also, the preferred embodiments described control the speed only of the audio signal, but it is also apparent that one skilled in the art can easily provide an apparatus which can control both the speed of the video signal and the speed of the audio signal.

What is claimed is:

1. A laser disk player karaoke apparatus comprising:
    a tempo difference detector which detects a time difference between a user's aural signal input from an external source and an aural synchronizing signal derived by digitally processing information reproduced from a laser disk in a digital signal processor; and
    a reproduced signal speed controller controlling output speed of an audio signal, the audio signal having been reproduced from the laser disk and output by the digital signal processor, in accordance with the time difference detected by said tempo difference detector.

2. A laser disk player karaoke apparatus as defined in claim 1, wherein the aural synchronizing signal is separately recorded on the laser disk when the laser disk is manufactured, to indicate when the user should begin singing the aural signal.

3. A laser disk player karaoke apparatus as defined in claim 2, wherein one song is recorded with a plurality of aural synchronizing signals.

4. A laser disk player karaoke apparatus as defined in claim 1, wherein the tempo difference detector comprises:
    a voice detecting unit for detecting the user's externally input aural signal; and
    a time difference detecting unit for detecting the time difference between the user's aural signal detected by the voice detecting unit and the aural synchronizing signal.

5. A laser disk player karaoke apparatus as defined in claim 4, wherein the voice detecting unit comprises an analog-to-digital converter for converting the user's aural signal into a digital signal.

6. A laser disk player karaoke apparatus as defined in claim 1, wherein the reproduced signal speed controller comprises:
    a buffer for sequentially storing the audio signal reproduced from the laser disk; and
    a clock converting unit for controlling the output speed of the audio signal sequentially stored in the buffer by generating a clock signal which changes in period in response to the time difference detected by said tempo difference detector.

7. A laser disk player karaoke apparatus comprising:
    a tempo difference detector which detects a time difference between a user's aural signal input from an external source and an aural synchronizing signal derived by digitally processing information reproduced from a laser disk in a digital signal processor; and
    a song appraisal unit which compares the detected time difference with a reference value, wherein a deviation between the time difference and the reference value in excess of a predetermined limit is counted and stored to thereafter be provided to the digital signal processor as data appraising the user's singing ability.

8. A laser disk player karaoke apparatus as defined in claim 7, wherein the aural synchronizing signal is separately recorded on the laser disk when the laser disk is manufactured, to indicate when the user should begin singing the aural signal.

9. A laser disk player karaoke apparatus as defined in claim 8, wherein one song is recorded with a plurality of aural synchronizing signals.

10. A laser disk player karaoke apparatus as defined in claim 7, wherein the tempo difference detector comprises:

a voice detecting unit for detecting the user's externally input aural signal; and a time difference detecting unit for detecting the time difference between the user's aural signal detected by the voice detecting unit and the aural synchronizing signal.

11. A laser disk player karaoke apparatus as defined in claim 10, wherein the voice detecting unit comprises an analog-to-digital converter for converting the user's aural signal into a digital signal.

12. A laser disk player karaoke apparatus as defined in claim 7, wherein the song appraisal unit comprises:

a time difference comparison unit for comparing the time difference detected by the tempo difference detector with the reference value;

a pulse generating unit for generating pulses in response to an error signal output from the time difference comparison unit whenever the time difference deviates by more than a predetermined amount from the reference value; and a microcomputer which counts the pulses generated by the pulse generating unit, which provides a rating of the user's singing ability based on the pulses counted, and which outputs the pulses as the rating to the digital signal processor to be displayed on a monitor.

13. A laser disk player karaoke apparatus comprising:

a tempo difference detector which detects a time difference between a user's aural signal input from an external source and an aural synchronizing signal derived by digitally processing information reproduced from a laser disk in a digital signal processor;

a reproduced signal speed controller controlling output speed of an audio signal which is reproduced from the laser disk and output by the digital signal processor in accordance with the time difference detected by said tempo difference detector; and a song appraisal unit comparing the detected time difference with a reference value, wherein a deviation between the time difference and the reference value in excess of a predetermined limit is counted and stored to thereafter be provided to the digital signal processor as data appraising the user's singing ability.

14. A laser disk player karaoke apparatus as defined in claim 13, wherein the aural synchronizing signal is separately recorded on the laser disk when the laser disk is manufactured, to indicate when the user should begin singing the aural signal.

15. A laser disk player karaoke apparatus as defined in claim 14, wherein one song is recorded with a plurality of aural synchronizing signals.

16. A laser disk player karaoke apparatus as defined in claim 13, wherein the tempo difference detector comprises:

a voice detecting unit for detecting the user's externally input aural signal; and a time difference detecting unit for detecting the time difference between the user's aural signal detected by the voice detecting unit and the aural synchronizing signal.

17. A laser disk player karaoke apparatus as defined in claim 16, wherein the voice detecting unit comprises an analog-to-digital converter for converting the user's aural signal into a digital signal.

18. A laser disk player karaoke apparatus as defined in claim 13, wherein the reproduced signal speed controller comprises:

a buffer for sequentially storing the audio signal reproduced from the laser disk; and a clock converting unit for controlling the output speed of the audio signal sequentially stored in the buffer by generating a clock signal which changes in period in response to the time difference detected by said tempo difference detector.

19. A laser disk player karaoke apparatus as defined in claim 13, wherein the song appraisal unit comprises:

a time difference comparison unit for comparing the time difference detected by the tempo difference detector with the reference value;

a pulse generating unit for generating pulses in response to an error signal output from the time difference comparison unit whenever the time difference deviates by more than a predetermined amount from the reference value; and a microcomputer which counts the pulses generated by the pulse generating unit, which provides a rating of the user's singing ability based on the pulses counted, and which outputs the pulses as the rating to the digital signal processor to be displayed on a monitor.

\* \* \* \* \*